(12) United States Patent
Offer

(10) Patent No.: US 6,993,948 B2
(45) Date of Patent: Feb. 7, 2006

(54) METHODS FOR ALTERING RESIDUAL STRESSES USING MECHANICALLY INDUCED LIQUID CAVITATION

(75) Inventor: Henry Peter Offer, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 410 days.

(21) Appl. No.: 10/460,180

(22) Filed: Jun. 13, 2003

(65) Prior Publication Data
US 2004/0250584 A1    Dec. 16, 2004

(51) Int. Cl.
*B21D 41/00* (2006.01)
*C21D 10/00* (2006.01)
*B05B 7/06* (2006.01)
*B24B 1/04* (2006.01)

(52) U.S. Cl. .............................. 72/53; 29/90.7; 72/430; 72/707

(58) Field of Classification Search .................... 72/53, 72/430, 707; 29/90.7
See application file for complete search history.

(56) References Cited

U.S. PATENT DOCUMENTS

| | | | |
|---|---|---|---|
| 4,342,425 A * | 8/1982 | Vickers | 239/424 |
| 6,170,308 B1 * | 1/2001 | Veronesi et al. | 72/53 |
| 6,343,495 B1 * | 2/2002 | Cheppe et al. | 72/53 |
| 6,467,321 B2 * | 10/2002 | Prokopenko et al. | 72/53 |
| 6,490,899 B2 * | 12/2002 | Berthelet et al. | 72/53 |
| 6,505,489 B2 * | 1/2003 | Berthelet et al. | 72/53 |
| 6,508,093 B2 * | 1/2003 | Berthelet et al. | 72/53 |
| 6,855,208 B1 * | 2/2005 | Soyama | 134/16 |
| 6,932,876 B1 * | 8/2005 | Statikov | 148/558 |

* cited by examiner

*Primary Examiner*—David B. Jones
(74) *Attorney, Agent, or Firm*—Nixon & Vanderhye P.C.

(57) ABSTRACT

A mechanical transducer induces liquid cavitation, causing pressure waves in a liquid which are applied against a metal surface to afford localized elastic and plastic tensile microstrain. The pressure waves alter the surface tensile stresses in the treated metal by reducing the tensile stresses or forming surface compressive stresses. A boot is provided about the operating face of the transducer for confining a liquid through which compression waves are generated and applied to the metal surface, the boot sealing about the transducer and the surface undergoing treatment.

12 Claims, 4 Drawing Sheets

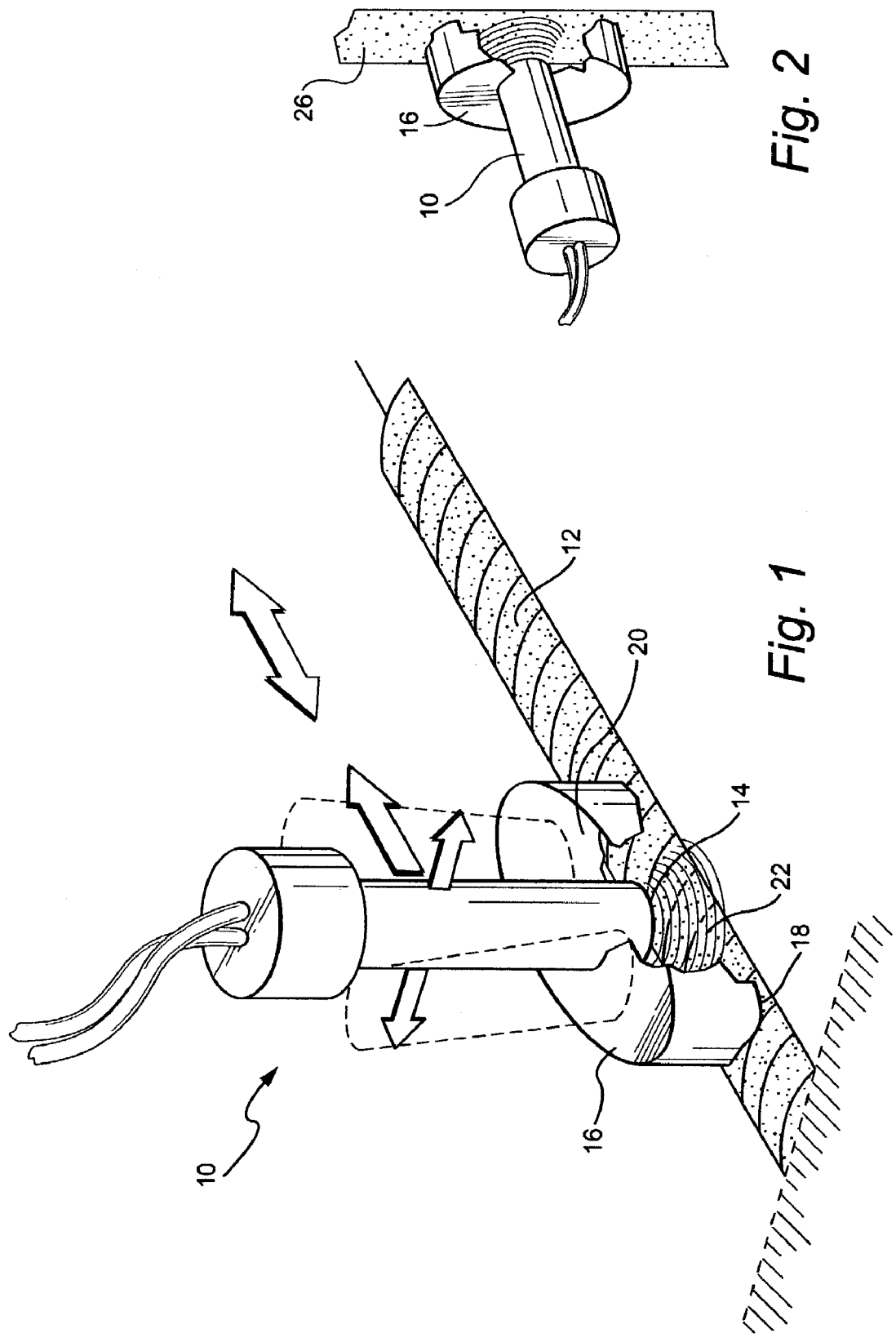

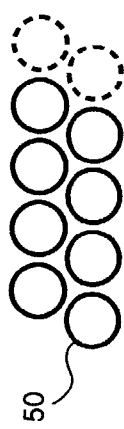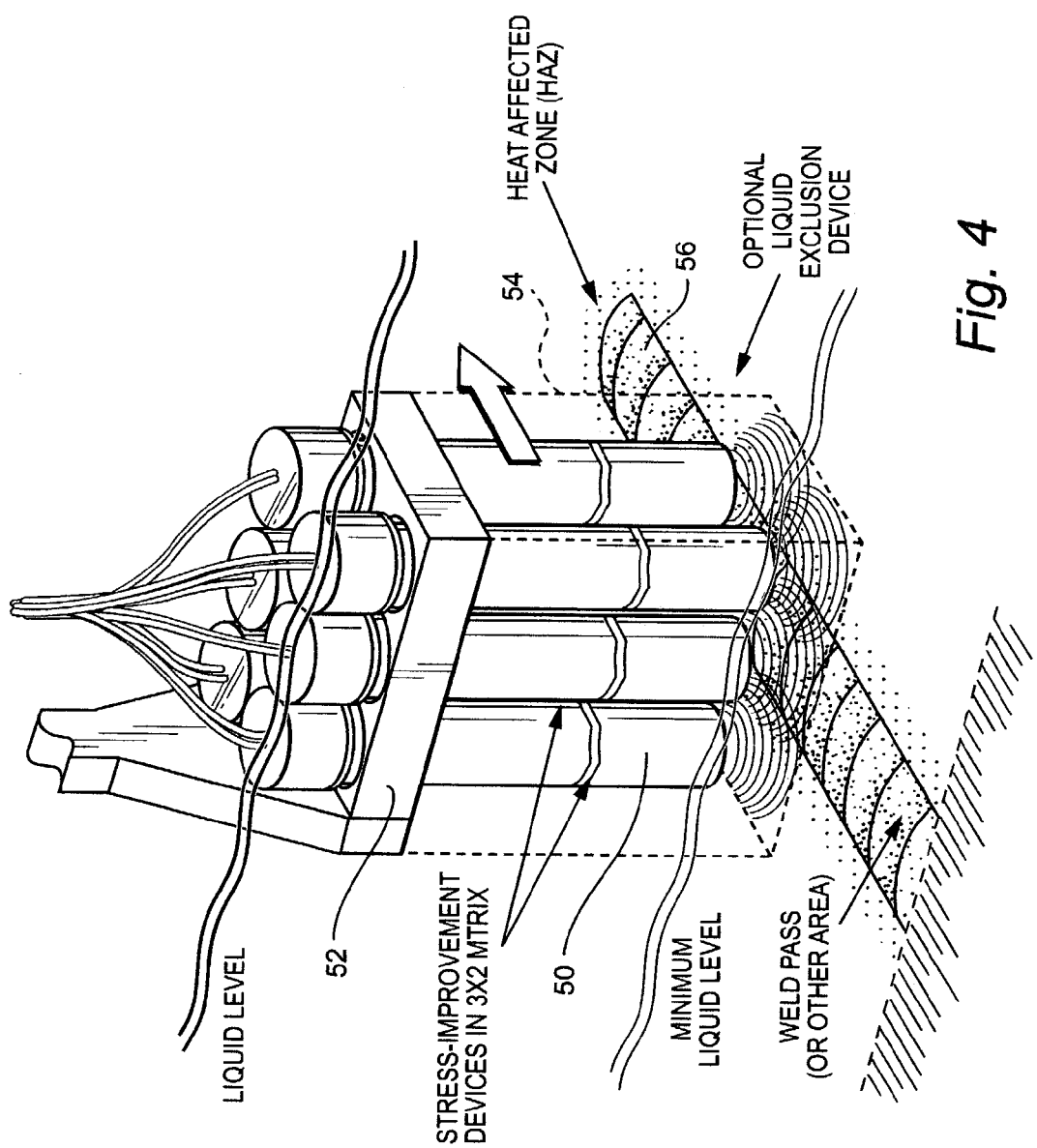

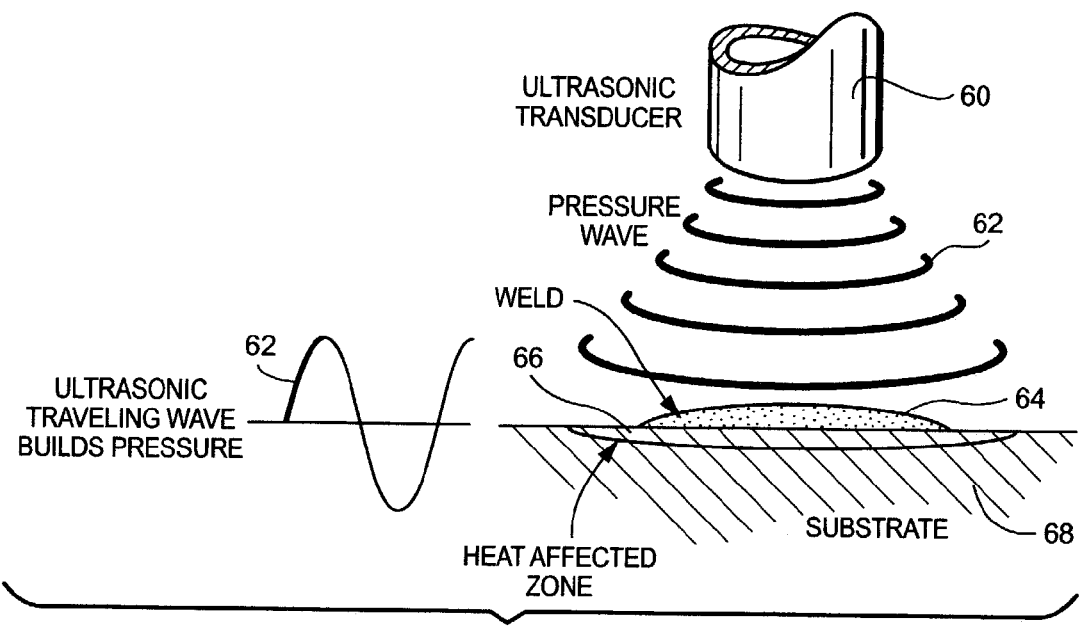
*Fig. 6A*
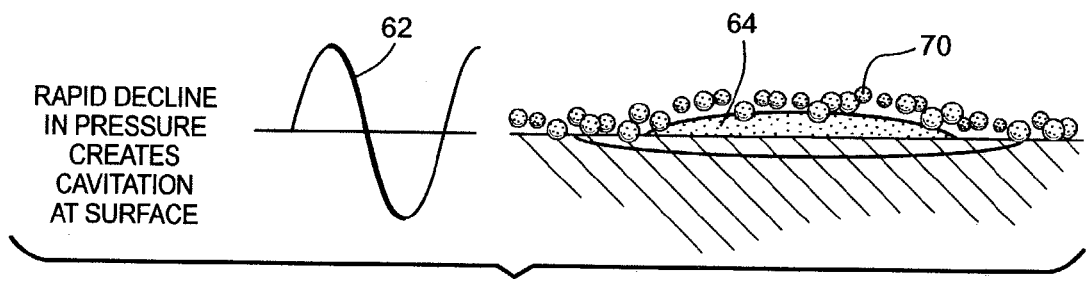
*Fig. 6B*
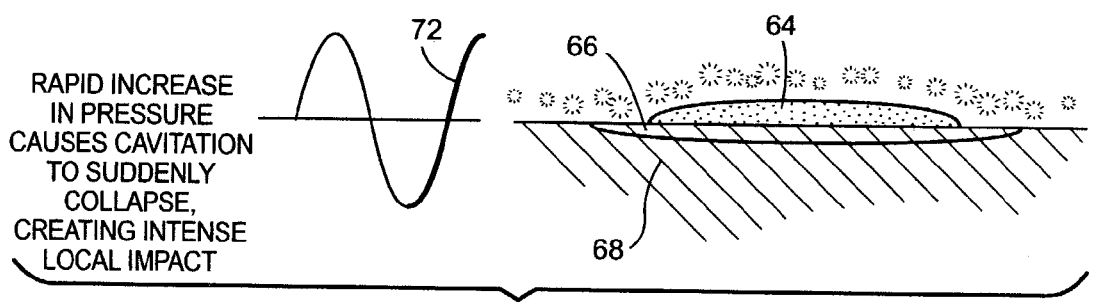
*Fig. 6C*
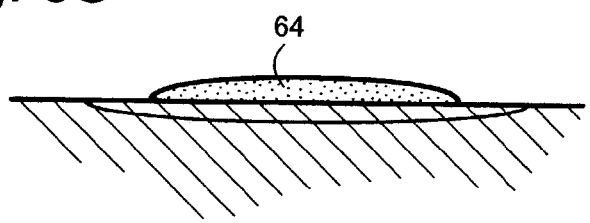
*Fig. 6D* — RESIDUAL STRESS IMPROVEMENT RESULTS IN TREATED MATERIALS

METHODS FOR ALTERING RESIDUAL STRESSES USING MECHANICALLY INDUCED LIQUID CAVITATION

BACKGROUND OF THE INVENTION

The present invention relates to methods for altering residual tensile stresses in a metal surface by using mechanically induced liquid cavitation and particularly relates to methods for either reducing the tensile stresses or converting the tensile stresses to compressive stresses in the metal surface using mechanically induced liquid cavitation.

Conventional welding processes, as well as other surface-affecting processes such as abrasive grinding, standard machining and electrical discharge machining (EDM) typically result in tensile values of surface residual stresses in a metal surface, e.g., a weld deposit and heat affected zones (HAZ). The value of these tensile stresses is often high, approaching or even exceeding the yield strength of the material. These residual stresses have often led to stress-corrosion cracking (SCC) in susceptible materials, particularly those exposed to the coolant in boiling water nuclear reactors. It is highly desirable to treat these welds and other high tensile-stress areas in either old or new applications so as to prevent SCC initiation, which requires the presence of a tensile surface stress.

In addition to SCC, tensile surface residual stresses can increase the risk of fatigue cracking initiation. Conventional mechanical peening with a peening hammer or shot blasting are known methods of changing a tensile surface residual stress (or a near-zero level of stress) to that of high compression. However, this change in stress is accompanied by a significant degree of undesirable surface and subsurface plastic flow (also known as cold-work). Conventional mechanical peening is unacceptable in many materials which are also susceptible to SCC, since significant amounts of surface cold-work are known to make otherwise SCC-resistant microstructures become susceptible to crack initiation when subjected to aggressive environments.

Several methods are known for improving the surface residual stress in metallic components. A prior method for decreasing tensile surface residual stress utilizes ultra-high pressure water jet peening to produce cavitation near the underwater treatment area. This area has the significant disadvantage of being restricted to partially or fully submerged components. This problem results from the need to allow unrestricted flow of the high-pressure water to the submerged (or internally flooded) work surface. This known method to change these residual tensile surface stresses to compressive stresses with the use of ultra high pressure water-jet peening is a locally-applied, mobile process, and has been developed for submerged component use only.

The water-jet stress modification method requires extremely expensive, massive water pumping and piping equipment, and produces a substantial reaction force on the jet nozzle. In addition, the degree of control of the rarefaction and compression periods of the pressure waves which create cavitation is relatively poor, since the wave driving forces (jet pressure and velocity at the nozzle) are predetermined constants, and the formation of pressure waves and corresponding cavitation is merely a by-product of the turbulence resulting from dissipation of the water jet velocity, and not a directly programmed parameter. Water-jet peening therefore is practically limited to more critical applications where the negative factors of high equipment cost, complex delivery system, minimal cavitation control, and low efficiency are sufficiently justified. It is also limited to those areas where sufficient equipment access exists for the required nozzle size and stand-off distance from the work surface.

Another method known for improving surface residual stresses is peening with repeated impact of a hammer or high-velocity shot; however, this method is prone to cause excessive plastic deformation (also known as "cold working") of the surface and near-surface material due to the severity of the impact mechanical forces. Use of a peening hammer has the disadvantage of not conforming closely to an uneven work surface, and therefore not providing uniform compression over the treated area, even with multiple hits. Use of shot blasting has the disadvantage that the used shot can readily become a contaminant in the area where the process is applied, even with a shot scavenging system.

A third method known for improving surface residual stress utilizes a pulsed laser beam directed at a submerged work surface, which is very locally and rapidly heated by the focused beam. The "Q-Switched" laser pulse forms a vapor cavity that is restrained from free expansion by the surrounding liquid, and therefore rapidly collapses at the work surface to generate a fluid compressive wave which in turn generates a permanent compression of the work surface after the wave dissipates. The vapor bubble is formed as the laser power sublimates a portion of the substrate surface material and working fluid or, preferably, a process coating applied to this surface. This tedious method also requires a submerged component, and must typically have an optically-absorptive surface coating (such as black paint) for effective laser heating. It is appropriately applied to smaller components which can be readily coated in a dry environment, submerged in liquid, and then laser-stress improvement treated. Contamination of the work surface by the optical coating may also be a problem either during the stress improvement treatment, or later when the component is put in service in a contamination-controlled environment. Accordingly, there is a need for altering residual tensile stresses in a metal surface with mechanically-induced liquid cavitation.

BRIEF DESCRIPTION OF THE INVENTION

In accordance with a preferred embodiment of the present invention, there is provided methods for altering residual tensile stresses in a metal surface, especially in those surfaces which, as machined or as welded, have high tensile stresses to reduce the tensile stresses or convert the tensile stresses to compressive stresses in the metal surface. Long-term stress benefits of the present invention are achieved by using the cumulative action of mechanically-induced acoustic cavitation of a liquid in contact with the surface layer of the metal whose stress is to be altered. Particularly, a mechanical cavitation transducer assembly is provided to afford intense cavitation of a liquid near the transducer face when vapor bubbles are formed where the local pressure in the flow field is made to fall below the saturation pressure due to the mechanically-induced pressure wave. Local boiling therefore occurs without the addition of heat. The bubbles formed during the rarefaction portion of the transducer's motion period rapidly collapse during the subsequent high-speed compression portion of the period, in turn causing localized high-energy compressive waves in the liquid. These waves travel toward the metal surface, where they provide the required local mechanical impulses to compress the nearby solid metal surface sufficiently to provide, after a predetermined processing time, localized elastic and plastic tensile microstrain. This localized tensile strained surface material is constrained by the surrounding body of undeformed material so that the remaining elastic portion of the microstrain in the deformed surface layer has reduced tensile stress, which convert to compression stresses when the applied hydraulic pressure force resulting from the collapse of each bubble or group of bubbles is removed. That is, by effectively water-hammering on the ductile metal surface, the portion impacted by the pressure wave stresses plastically in the treated zone by tensile microstrain. Since this zone is integral with and mechanically constrained by the surrounding work surface, the tensile stresses are reduced and, importantly, the sign of the stress in the zone may change from tensile to compressive, as desired, when the applied stress from the pressure wave is released. After a sufficient period of treatment, the underlying area beneath the treated zone goes into tension to maintain the required balance of internal forces. Thus, the integrated effect of many mechanically induced cavitation bubbles collapsing over a localized predetermined area and for a predetermined time provides the desired magnitude of compressive surface residual stress. The altered stress effect extends to a controlled depth in the work piece without excessively deforming the surface of the material in which it is generated and is self-limiting in this regard due to the controlled bubble size generated by the bubble cavitation implosion mechanism.

The cavitation transducer assembly may be provided in a highly mobile form in order to alter the stress along an area by progressively scanning or traversing the area. Larger and/or multiple transducers may be utilized. For a given material, the average rate and depth of compression achieved are controlled by the power supply process parameters, including transducer power level, power oscillation frequency and use of an amplitude booster. The transducer parameters affecting the process effectiveness include the number of transducers, transducer face area, substrate stand-off distance, forward speed travel, adjacent pass overlap and lateral oscillation width/speed, if any. It will be appreciated that the mechanical transducer may be operated in a submerged environment or be provided with a liquid containment boot whereby the water-hammering effect can be transmitted through the liquid contained in the boot to the local surface.

By mitigating the detrimental effects of tensile surface residual stress in structural components, stress corrosion cracking initiation in structural materials may be prevented, particularly those exposed to high-temperature oxygenated water in boiling water nuclear reactor environments. Fatigue crack initiation is also minimized, particularly for those components subject to high-fatigue duty, such as jet pump riser brace to vessel weld repairs in boiling water nuclear reactors. It will be appreciated that the present methods produce reduced or compressive surface and near-surface residual stresses with significantly lower plastic strain in the exposed surface rendering the final cold-work condition of the surface acceptable, the degree of cold-work being controlled to be less than the threshold for stress corrosion cracking.

In a preferred embodiment according to the present invention, there is disclosed a method for altering residual tensile stresses in a metal surface comprising the steps of (a) mechanically inducing acoustic cavitation in a liquid to form compressive waves in the liquid and (b) applying the induced compressive waves to the metal surface to reduce the tensile stresses or convert the tensile stresses to compressive stresses therein.

In a further preferred embodiment according to the present invention, there is provided a method for altering residual tensile stresses in a metal surface, comprising the steps of (a) submerging an ultrasonic transducer in a liquid, (b) generating a pressure wave by operation of the transducer, (c) inducing a local pressure in the liquid adjacent the metal surface below the saturation pressure to create cavitation bubbles, and (d) subsequent to step (c), inducing a pressure wave to collapse the cavitation bubbles to impact the metal surface to reduce tensile stresses or convert the tensile stresses in the metal surface to compressive stresses.

BRIEF DESCRIPTION OF THE DRAWINGS

FIG. 1 is a schematic illustration of a mechanical transducer for inducing liquid cavitation for altering stresses along a metal surface;

FIG. 2 is a schematic illustration with portions broken out for clarity of a similar transducer applicable to vertical surfaces;

FIG. 4 is a perspective view illustrating schematically an array of mechanical transducers for inducing liquid cavitation for altering stresses along the metal surface;

FIG. 5 is a schematic illustration of the transducer array with the transducers offset from one another for greater density; and FIGS. 6A–6D schematically illustrate the mechanism for reducing the tensile stresses or converting the tensile stresses to compressive stresses in the metal surface using mechanically induced liquid cavitation.

DETAILED DESCRIPTION OF THE INVENTION

Figure 3:
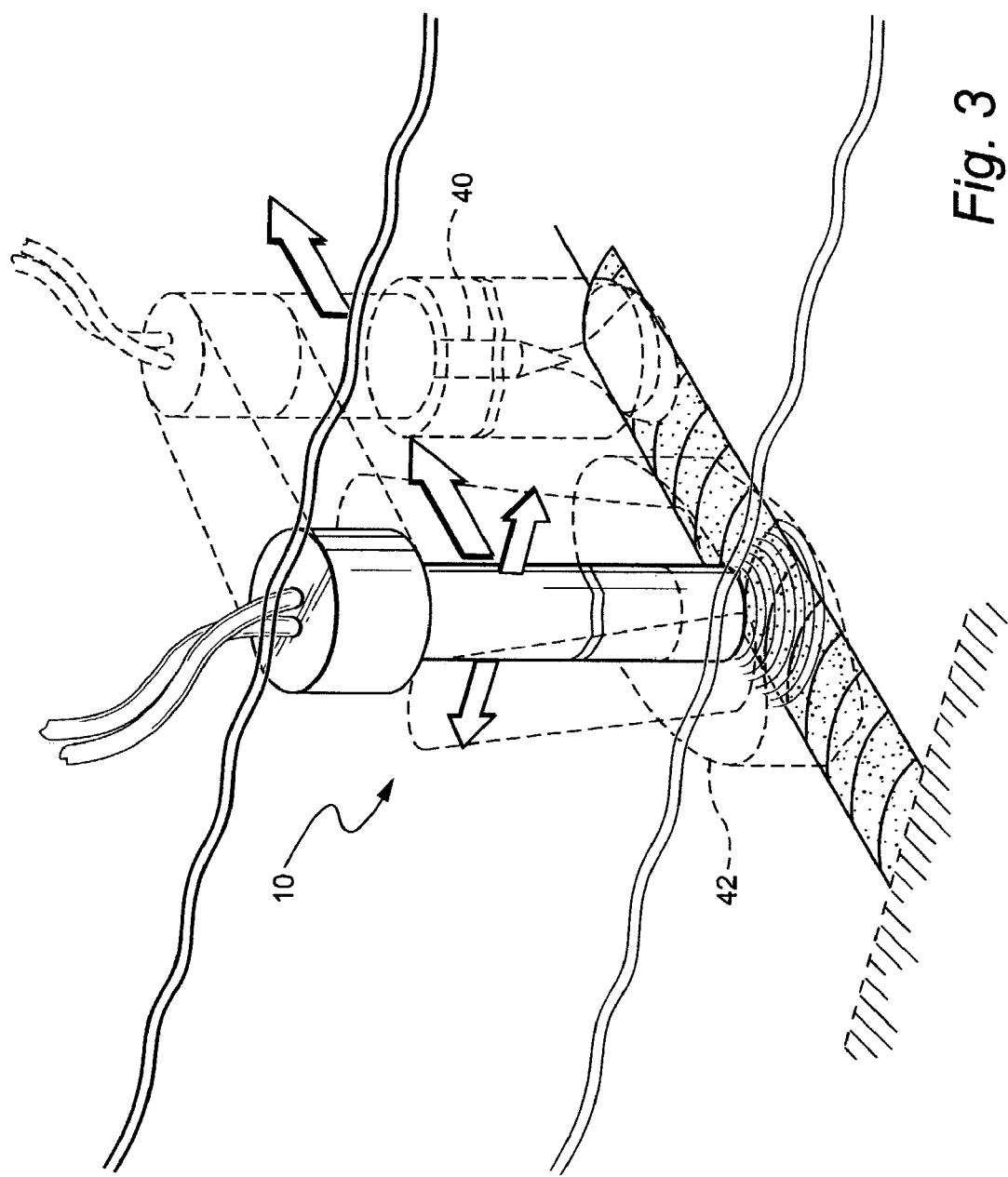
FIG. 3 is a view similar to FIG. 1 illustrating the use of the mechanical transducer in a submerged environment.

Referring now to the drawing figures, particularly to FIG. 1, there is illustrated a mechanical transducer, generally designated 10, for generating liquid cavitation to alter the residual stress level in a metal surface, for example, the weld 12, to which the transducer is applied. Transducer 10 may be of any known type, for example, may be of the type manufactured for ultrasonic welding. As illustrated, the operable face 14 of transducer 10 is disposed in opposition to the surface whose stress is to be altered. In the illustrated form, a boot 16 surrounds the operating face 14 of transducer 10 and margins 18 of boot 16 engage the metal surface 12. The boot is filled with a liquid 20 which is maintained within the confined space bounded by the operating face 14, portions of transducer 10, boot 16 and the metal surface.

With the operating face 14 opposite the surface 12, the vibratory action of the face 14 of transducer 10 repetitively and at high frequency forms and collapses bubbles in the liquid. The periodic formation and collapse of the bubbles causes localized high-energy compressive loads in the liquid denoted at 22 in FIG. 1. These loads travel toward the surface 12 and provide local mechanical impulses or pressure waves compressing the surface 12 sufficiently, after a predetermined processing time, to afford localized elastic and plastic tensile microstrain. Because the surface 12 being treated is surrounded by untreated metal which mechanically constrains the metal surface 12 repetitively impacted by the pressure waves, the tensile stress in the application zone is reduced and converts to a compressive stress when the applied hydraulic force is removed. The underlying area below the treated zone goes into tension to maintain the needed balance in the internal forces. Because the residual tensile stress zone is below the treated metal surface and not exposed to the surface environment of the component being treated, the residual tensile stress is benign. The mechanically induced stresses reduce or provide compressive surface and near-surface residual stresses with significantly lower plastic strain in the exposed surface, rendering the final surface condition acceptable and its stress condition less than the threshold stress condition for stress corrosion cracking. It will be appreciated that the cavitation pressure waves must be sufficiently high to exceed at least the microyield strength of the substrate and preferably the generally tensile yield strength. The transducer 10 is particularly useful for annealed materials low in strength but may be utilized for other materials as well. Further, the invention is not limited to altering residual metal surfaces in welds as illustrated but is applicable to any ductile surface in which it is desirable to alter the residual surface tensile stresses.

As illustrated in FIG. 1, the transducer is highly mobile and is progressively scanned or traversed over an area. Thus, the transducer may be displaced linearly, for example, along a weld surface 12, or oscillated in a transverse direction along the same surface, or a combination of oscillatory and linear movements may be used.

In FIG. 2, the transducer is applied to a vertical metal surface 26. The transducer 10 includes the boot 16 which confines the liquid in the boot such that the pressure waves can be developed by the operating face of the transducer in juxtaposition to liquid and surface 26, similarly as described with respect to FIG. 1. It will be appreciated that the alteration of the stress in accordance with a preferred embodiment of the present invention does not require heating of any type or heating of the surface which is to be stress-altered.

Referring to FIG. 3, the transducer 10 of FIG. 1 is illustrated in conjunction with a welding torch 40. That is, the transducer 10 may follow the movement of the welding torch in joining component parts to one another or adding weld material to alter the residual surface stress of the weld. In the embodiment of FIG. 3, the welding, as well as the stress alteration, is performed in a submerged environment, for example, in the liquid moderator environment of a boiling water nuclear reactor. It will be appreciated that the pressure waves may comprise the liquid in which the transducer is submerged as in FIG. 3, or may comprise a liquid different than the liquid in which the transducer is submerged. In the latter instance, a boot 42, as indicated by the dashed lines in FIG. 3, is also provided, separating the two liquids one from the other.

FIG. 4 illustrates a ganged array of mechanical transducers 50 disposed in a support 52. In the illustrated form, an optional liquid exclusion device is schematically illustrated at 54, it being appreciated that the ganged array of transducers 50 are disposed in a liquid environment. As in the embodiment of FIG. 1, the ganged array is advanced along a weld 56. As illustrated, the vibratory action of the transducers repetitively and at high frequency form and collapse bubbles in the liquid, generating pressure waves compressing the weld surface 56, affording localized elastic and plastic tensile microstrain. The broader overlapping pattern of transducers treats a broader area in a single pass than a single transducer overlying a weld.

Referring to FIG. 5, it will also be appreciated that the transducers 50 may be offset from one another. In this manner, the transducers 50 may be offset for greater density and, hence, greater concentration of pressure waves compressing the weld surface.

Referring to FIGS. 6A–6D, there is schematically illustrated the mechanism by which the tensile stresses are reduced or converted to compressive stresses in the metal surfaces using mechanically induced liquid cavitation. In FIG. 6A, the transducer 60 produces traveling waves 62 which build pressure on the weld 64 and the heat-affected zone 66 of the substrate 68. As the pressure wave declines, as illustrated in FIG. 6B, cavitation bubbles 70 are created at the surface of the weld 64. The following rapid increase in the pressure caused by a succeeding pressure wave 72 causes the cavitation, i.e., the bubbles, to suddenly collapse, creating intense local impact on the surface of the weld and the heat-affected zone surrounding the weld. Finally, in FIG. 6D, the impact on the weld surface relieves the reduced tensile stress or compressive stresses in the weld 64 with the underlying area of the weld going into tension to maintain balance internally within the substrate and weld. Plastic strain in the exposed surface of the weld is substantially reduced, resulting in a stress condition lower than necessary for stress corrosion cracking to occur.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for altering residual tensile stresses in a metal surface comprising the steps of:
   (a) mechanically inducing acoustic cavitation in a liquid to form compressive waves in the liquid; and
   (b) applying the induced compressive waves to the metal surface to reduce the tensile stresses or convert the tensile stresses to compressive stresses therein.

2. A method according to claim 1 including surrounding at least a portion of a transducer producing the acoustic cavitation within an envelope for containing the liquid affording localized compressive waves for application to the metal surface.

3. A method according to claim 1 wherein steps (a) and (b) are performed submerged in a liquid environment.

4. A method according to claim 3 including surrounding at least a portion of a transducer producing the acoustic cavitation within an envelope for containing the liquid or a different liquid.

5. A method according to claim 1 including traversing a transducer producing the acoustic cavitation in a linear direction along the metal surface.

6. A method according to claim 1 including oscillating a transducer producing the acoustic cavitation in opposition to the metal surface.

7. A method according to claim 1 including disposing an operating face of a transducer producing the acoustic cavitation in spaced opposition to the metal surface to impact pressure waves generated thereby against the metal surface.

8. A method according to claim 1 wherein step (a) includes providing an ultrasonic transducer in the liquid to produce a compressive wave.

9. A method according to claim 1 wherein step (a) includes providing an array of transducers in the liquid to form the compressive waves.

10. A method for altering residual tensile stresses in a metal surface, comprising the steps of:
    (a) submerging an ultrasonic transducer in a liquid;
    (b) generating a pressure wave by operation of the transducer;

(c) inducing a local pressure in the liquid adjacent the metal surface below the saturation pressure to create cavitation bubbles; and (d) subsequent to step (c), inducing a pressure wave to collapse the cavitation bubbles to impact the metal surface to reduce tensile stresses or convert the tensile stresses in the metal surface to compressive stresses.

11. A method according to claim 10 including surrounding at least a portion of a transducer producing the acoustic cavitation within an envelope for containing the liquid affording localized compressive waves for application to the metal surface.

12. A method according to claim 10 including traversing the transducer in a linear direction while producing acoustic cavitation.

* * * * *